United States Patent
Hung et al.

(10) Patent No.: US 10,055,143 B2
(45) Date of Patent: Aug. 21, 2018

(54) SOLID STATE DRIVE AND DATA PROGRAMMING METHOD THEREOF

(71) Applicants: Lite-On Electronics (Guangzhou) Limited, Guangzhou (CN); LITE-ON TECHNOLOGY CORPORATION, Taipei (TW)

(72) Inventors: Min-I Hung, Taipei (TW); Liang-You Lin, Taipei (TW); Yu-Chuang Peng, Taipei (TW); Ya-Ping Pan, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 76 days.

(21) Appl. No.: 15/098,860

(22) Filed: Apr. 14, 2016

(65) Prior Publication Data

US 2017/0147232 A1 May 25, 2017

(30) Foreign Application Priority Data

Nov. 25, 2015 (CN) .......................... 2015 1 0833643

(51) Int. Cl.
*G06F 12/02* (2006.01)
*G06F 3/06* (2006.01)
*G06F 12/0804* (2016.01)

(52) U.S. Cl.
CPC ............ *G06F 3/0613* (2013.01); *G06F 3/064* (2013.01); *G06F 3/0608* (2013.01); *G06F 3/0658* (2013.01); *G06F 3/0679* (2013.01); *G06F 12/0246* (2013.01); *G06F 12/0253* (2013.01); *G06F 12/0804* (2013.01); *G06F 3/0652* (2013.01); *G06F 2212/1021* (2013.01); *G06F 2212/1044* (2013.01); *G06F 2212/152* (2013.01); *G06F 2212/214* (2013.01); *G06F 2212/281* (2013.01); *G06F 2212/313* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 7,444,462 B2 | 10/2008 | Traister et al. | |
| 8,990,480 B2* | 3/2015 | Kanno | G06F 12/0246 711/103 |
| 9,342,458 B2* | 5/2016 | Hu | G06F 12/0246 |
| 2008/0034175 A1* | 2/2008 | Traister | G06F 12/0246 711/159 |

(Continued)

*Primary Examiner* — Mano Padmanabhan
*Assistant Examiner* — Jean C Edouard
(74) *Attorney, Agent, or Firm* — WPAT, PC

(57) ABSTRACT

A data programming method for a solid state drive is provided. The solid state drive has a flash memory with plural blocks. If a garbage collection is determined to be performed, a first open block is selected from the plural blocks of the flash memory for storing a moved valid data corresponding to the garbage collection. Then, the moved valid data corresponding to the garbage collection is programmed into the first open block. A second open block is selected from the plural blocks of the flash memory for storing a write data from a host.

10 Claims, 8 Drawing Sheets

(56) References Cited

U.S. PATENT DOCUMENTS

| | | | | |
|---|---|---|---|---|
| 2008/0129740 | A1* | 6/2008 | Itagaki | G06F 17/30244 345/502 |
| 2010/0082890 | A1* | 4/2010 | Heo | G06F 12/0246 711/103 |
| 2010/0217927 | A1* | 8/2010 | Song | G06F 3/0616 711/103 |
| 2011/0022778 | A1* | 1/2011 | Schibilla | G06F 12/0246 711/103 |
| 2011/0029749 | A1* | 2/2011 | Yang | G06F 12/0246 711/162 |
| 2011/0153911 | A1* | 6/2011 | Sprouse | G06F 12/0851 711/103 |
| 2011/0246821 | A1* | 10/2011 | Eleftheriou | G06F 11/2087 714/15 |
| 2012/0054414 | A1* | 3/2012 | Tsai | G06F 12/0246 711/103 |
| 2012/0084489 | A1* | 4/2012 | Gorobets | G06F 12/0246 711/103 |
| 2012/0151124 | A1* | 6/2012 | Baek | G06F 12/0246 711/103 |
| 2012/0173795 | A1* | 7/2012 | Schuette | G06F 12/0246 711/103 |
| 2012/0284587 | A1* | 11/2012 | Yu | G06F 3/0608 714/773 |
| 2012/0290769 | A1* | 11/2012 | Okubo | G06F 12/0246 711/103 |
| 2013/0019057 | A1* | 1/2013 | Stephens | G06F 11/108 711/103 |
| 2013/0103889 | A1* | 4/2013 | Jeong | G06F 12/0246 711/103 |
| 2013/0132647 | A1* | 5/2013 | Melik-Martirosian | G06F 12/0246 711/103 |
| 2013/0151892 | A1* | 6/2013 | Huang | G06F 12/0246 714/14 |
| 2013/0166818 | A1* | 6/2013 | Sela | G06F 12/0246 711/103 |
| 2014/0019670 | A1* | 1/2014 | Huang | G06F 12/0246 711/103 |
| 2014/0029341 | A1* | 1/2014 | In | G06F 12/0246 365/185.12 |
| 2014/0122774 | A1* | 5/2014 | Xian | G06F 12/0246 711/103 |
| 2014/0189209 | A1* | 7/2014 | Sinclair | G06F 12/0246 711/103 |
| 2014/0281338 | A1* | 9/2014 | Choi | G06F 12/0269 711/170 |
| 2015/0261797 | A1* | 9/2015 | Alcantara | G06F 17/30306 707/813 |

* cited by examiner

|  | Page_1 | Page_2 | Page_3 | Page_4 |
|---|---|---|---|---|
| Block_1 | Data1 | Data2 | Data3 | Data4 |
| Block_2 | Data5 | Data6 | Data7 | Data8 |
| Block_3 | Data8' | Data2' | Data9 | Data10 |
| Block_4 | Data11 | Data7' | Data12 | Data13 |
| Block_5 |  |  |  |  |

FIG. 2B (PRIOR ART)

|  | Page_1 | Page_2 | Page_3 | Page_4 |
|---|---|---|---|---|
| Block_1 | Data1 | Data2 | Data3 | Data4 |
| Block_2 | Data5 | Data6 | Data7 | Data8 |
| Block_3 | Data8' | Data2' | Data9 | Data10 |
| Block_4 | Data11 | Data7' | Data12 | Data13 |
| Block_5 | Data14 | Data3' | Data7'' | Data12' |

| | Data1 |
|---|---|
| | Data15 |
| | Data4 |
| | Data16 |
| | Data17 |
| | Data5 |
| | Data6 |
| | Data18 |
| | |

107

105

| | Page_1 | Page_2 | Page_3 | Page_4 |
|---|---|---|---|---|
| Block_1 | ~~Data1~~ | ~~Data2~~ | ~~Data3~~ | ~~Data4~~ |
| Block_2 | ~~Data5~~ | ~~Data6~~ | ~~Data7~~ | ~~Data8~~ |
| Block_3 | Data8' | Data2' | Data9 | Data10 |
| Block_4 | Data11 | ~~Data7'~~ | ~~Data12~~ | Data13 |
| Block_5 | Data14 | Data3' | Data7" | Data12' |

FIG. 3B (PRIOR ART)

| | Data1 |
|---|---|
| | Data15 |
| | Data4 |
| | Data16 |
| | Data17 |
| | Data5 |
| | Data6 |
| | Data18 |
| | |

107

105

| | Page_1 | Page_2 | Page_3 | Page_4 |
|---|---|---|---|---|
| Block_1 | | | | |
| Block_2 | | | | |
| Block_3 | Data8' | Data2' | Data9 | Data10 |
| Block_4 | Data11 | ~~Data7'~~ | ~~Data12~~ | Data13 |
| Block_5 | Data14 | Data3' | Data7" | Data12' |

| | Page_1 | Page_2 | Page_3 | Page_4 |
|---|---|---|---|---|
| Block_1 | Data1 | Data15 | Data4 | Data16 |
| Block_2 | Data17 | Data5 | Data6 | Data18 |
| Block_3 | Data8' | Data2' | Data9 | Data10 |
| Block_4 | Data11 | ~~Data7'~~ | ~~Data12~~ | Data13 |
| Block_5 | Data14 | Data3' | Data7" | Data12' |

SOLID STATE DRIVE AND DATA PROGRAMMING METHOD THEREOF

This application claims the benefit of People's Republic of China Application Serial No. 201510833643.9, filed Nov. 25, 2015, the subject matter of which is incorporated herein by reference.

FIELD OF THE INVENTION

The present invention relates to a solid state drive and a data programming method thereof, and more particularly to a solid state drive with a garbage collection function and a data programming method comprising the garbage collection.

BACKGROUND OF THE INVENTION

As is well known, a solid state drive (SSD) is a data storage device that uses a non-volatile memory to store data. A NAND-based flash memory is one kind of the non-volatile memory. After data are written to the flash memory, if the system is powered off, the data are still retained in the flash memory.

FIG. 1 is a schematic functional block diagram illustrating a conventional solid state drive. As shown in FIG. 1, the solid state drive 10 comprises a controller 101, a buffer 107 and a flash memory 105. The controller 101 is in communication with the flash memory 105 and the buffer 107. In addition, the controller 101 is in communication with a host 12 through an external bus 20. Consequently, commands and data can be exchanged between the controller 101 and the host 12.

A process of programming write data from the host 12 into the flash memory 105 will be illustrated as follows. Firstly, the controller 101 performs an error correction (ECC) encoding operation on the write data, and then temporarily stores the write data into the buffer 107. Moreover, the controller 101 performs a program action at proper time in order to store the write data of the buffer 107 into the flash memory 105.

For example, the buffer 107 is a cache memory such as a static random access memory (SRAM) or a dynamic random access memory (DRAM). Generally, the external bus 20 is a USB bus, an IEEE 1394 bus, an SATA bus, or the like.

Generally, the flash memory 105 comprises plural blocks, for example 1024 blocks. Each block comprises plural pages, for example 64 pages. Each page is typically 4K bytes in size. Due to the inherent properties of the flash memory 105, at least one page is written during the program action, and the erase operation is performed in a block-wise fashion.

Generally, the host 12 accesses the flash memory 105 through logical block addresses (LBA). Each LBA can store data of 512 bytes in size. When the host 12 intends to program the write data into the flash memory 105, the host 12 may provide a write command and a corresponding LBA to the controller 101. Then, the write data is transmitted from the host 12 to the controller 101. The write data is temporarily stored in the buffer 107 by the controller 101.

For example, if one page of the flash memory 105 is 4K bytes in size, the data amount of eight LBAs is equal to the data amount of one page. As known, the flash memory 105 is programmed in a unit of at least one page. If the amount of data temporarily stored in the buffer 107 exceeds the data amount of one page, the controller 101 starts the program action and programs the data to the flash memory 105 in a unit of at least one page.

Moreover, the controller 101 selects one free block of the flash memory 105 as an open block. While the program action is performed, the data temporarily stored in the buffer 107 is programmed into the open block under control of the controller 101. After the open block is occupied by the data, the controller 101 will select another block as another open block and continuously program the data of the buffer 107 into this open block.

Since the erase operation of the flash memory 105 is performed in a block-wise fashion, the data is each page cannot be individually erased and updated. After an updated data is received by the flash memory 105, the updated data is stored in a new page (i.e., a blank page), and the original data in the old page is set as an invalid data. However, after the flash memory 105 has been accessed for a long time, each block of the flash memory 105 may contain some valid data and some invalid data. Consequently, the writable space of the flash memory 105 gradually decreases.

FIGS. 2A~2C schematically illustrate a process of updating data of a conventional flash memory. It is assumed that the flash memory has five blocks (Block_1~Block_5). Each block has four pages (Page_1~Page_4).

As shown in FIG. 2A, the first block (Block_1) stores the data Data1~Data4, and the second block (Block_2) stores the data Data5~Data8.

For example, the host 12 intends to output the write data Data8', Data2', Data9, Data10, Data11, Data7', Data12 and Data13 to the flash memory 105. The write data Data2', Data7' and Data8' are updated data of the data Data2, Data7 and Data8, respectively. The write data Data9~Data13 are new data.

Please refer to FIG. 2B. The controller 101 selects the third block (Block_3) as the open block, and programs the Data8', Data2', Data9 and Data10 into the third block (Block_3). As the third block (Block_3) is occupied by the data, the controller 101 selects the fourth block (Block_4) as the open block, and programs the data Data11, Data7', Data12 and Data13 into the fourth block (Block_4). And then, the old data Data2, Data7 and Data8 will be considered as invalid data, which are indicated as oblique lines.

Then, the host 12 intends to output the write data Data14, Data3', Data7" and Data12' to the flash memory 105. The write data Data3', Data7" and Data12' are updated data of the data Data3, Data7' and Data12, respectively. The write data Data14 is a new data.

Please refer to FIG. 2C. The controller 101 selects the fifth block (Block_5) as the open block, and programs the Data14, Data3', Data7" and Data12' into the fifth block (Block_5). And then, the old data Data3, Data7' and Data12 will be considered as invalid data, which are indicated as oblique lines.

From the above discussions, after many program actions, the flash memory 105 may contain a great number of invalid data. Consequently, the writable space of the flash memory gradually decreases. Moreover, the erase operation of the flash memory 105 can be performed in a block-wise fashion. Although the flash memory 105 as shown in FIG. 2C has many invalid data, some blocks still contain valid data. In other words, the block containing the valid data cannot be directly erased by the controlling unit 101.

As the number of free blocks in the flash memory 105 gradually decreases, it is necessary for the controller 101 of the solid state drive 10 to perform a garbage collection. After the garbage collection is performed, the storing space of the invalid data in the used blocks can be released. Consequently, the writable space of the flash memory 105 increases.

Generally, when the host 12 issues a write command, the write command may be determined as a sequential write command or a random write command according to the logical block address (LBA) from the host 12. For example, if the LBA in the write command is a consecutive logical block address, the write command from the host 12 is determined as the sequential write command. Moreover, according to the sequential write command, the write data from the host 12 is continuously stored into the flash memory 105. For example, the host 12 will continuously overwrite the flash memory 105 or continuously update the data. Hereinafter, the operations of the garbage collection of the conventional flash memory after the situation of FIG. 2C will be illustrated.

FIGS. 3A-3F schematically illustrate a data programming method comprising the garbage collection according to the prior art. For example, the controller 101 intends to release the storing space of the invalid data from the first block (Block_1) and the second block (Block_2). Please refer to FIG. 3A. The valid data Data1, Data4, Data5 and Data6 in the first block (Block_1) and the second block (Block_2) are moved to the buffer 107 by the controller 101. And then, the data Data1, Data4, Data5 and Data6 in the first block (Block_1) and the second block (Block_2) will be considered as invalid data, which are indicated as oblique lines.

While the valid data in the to-be-released blocks are moved by the controller 101, the write data from the host 12 may be continuously received by the buffer 107. In other words, the controller 101 can simultaneously perform the garbage collection and receive the write data from the host 12. As shown in FIG. 3A, the buffer 107 contains the valid data Data1, Data4, Data5 and Data6 of the first block (Block_1) and the second block (Block_2) and the write data Data15, Data16, Data17 and Data18 from the host 12. The write data Data15, Data16, Data17 and Data18 are sequential write data.

As shown in FIG. 3B, the controller 101 confirms that no valid data are contained in the first block (Block_1) and the second block (Block_2). Then, the controller 101 performs a block erase operation on the first block (Block_1) and the second block (Block_2). Consequently, the first block (Block_1) and the second block (Block_2) are erased as free blocks.

Then, as shown in FIG. 3C, the controller 101 performs the program action to program the data of the buffer 107 into the flash memory 105. Consequently, one programming procedure comprising the garbage collection is completed. That is, the controller 101 firstly selects the first block (Block_1) as the open block, and programs the data Data1, Data15, Data4 and Data16 into the first block (Block_1). Then, the controller 101 selects the second block (Block_2) as the open block, and programs the data Data17, Data5, Data6 and Data18 into the second block (Block_2).

While the controller 101 performs the programming procedure comprising the garbage collection, if the block to be erased contains the valid data and the invalid data, the controller 101 has to move the valid data from the block to the buffer 107, and the controller 101 has to receive the write data from the host 12 and temporarily store the write data into the buffer 107. In other words, while the controller 101 performs the programming procedure comprising the garbage collection, the moved valid data corresponding to the garbage collection and the write data from the host 12 are temporarily stored in the buffer 107 in an interlaced manner. Consequently, after the data in the buffer 107 are programmed to the open blocks of the flash memory 105 by the controller 101, the moved valid data corresponding to the garbage collection and the write data from the host 12 are stored into the first block (Block_1) and the second block (Block_2) in the interlaced manner.

Please refer to FIG. 3C again. If the storing space of the flash memory 105 is insufficient, the controller 101 has to re-perform the garbage collection in order to program the new or updated data. For example, the host 12 intends to program the write data Data15', Data16', Data17' and Data18' to the flash memory 105. The write data Data15', Data16', Data17' and Data18' are sequential write data. In addition, the write data Data15', Data16', Data17' and Data18' are updated data of the data Data15, Data16, Data17 and Data18, respectively. As shown in FIG. 3C, the old data Data15, Data16, Data17 and Data18 in the first block (Block_1) and the second block (Block_2) will be considered as the invalid data because these data have been updated. However, since the moved valid data corresponding to the garbage collection are still stored in the first block (Block_1) and the second block (Block_2), the controller 101 has to re-perform the garbage collection in order to move these valid data to the buffer 107. Then, the controller 101 will perform a block erase operation on the first block (Block_1) and the second block (Block_2).

The process of performing another garbage collection will be illustrated with reference to FIGS. 3D-3F. Firstly, as shown in FIG. 3D, the valid data Data1, Data4, Data5 and Data6 in the first block (Block_1) and the second block (Block_2) are moved to the buffer 107 by the controller 101. And then, the data Data1, Data4, Data5 and Data6 in the first block (Block_1) and the second block (Block_2) will be considered as invalid data, which are indicated as oblique lines.

Similarly, while the valid data in the to-be-released blocks are moved by the controller 101, the write data from the host 12 are continuously received by the buffer 107. As shown in FIG. 3D, the buffer 107 contains the valid data Data1, Data4, Data5 and Data6 of the first block (Block_1) and the second block (Block_2) and the write data Data15', Data16', Data17' and Data18' from the host 12. And then, the old data Data15, Data16, Data17 and Data18 in the first block (Block_1) and the second block (Block_2) will be considered as the invalid data because these data have been updated.

As shown in FIG. 3E, the controller 101 confirms that no valid data are contained in the first block (Block_1) and the second block (Block_2). Then, the controller 101 performs a block erase operation on the first block (Block_1) and the second block (Block_2). Consequently, the first block (Block_1) and the second block (Block_2) are erased as free blocks.

Then, as shown in FIG. 3F, the controller 101 performs the program action to program the data of the buffer 107 into the flash memory 105. Consequently, another programming procedure comprising the garbage collection is completed. That is, the controller 101 firstly selects the first block (Block_1) as the open block, and programs the data Data1, Data15', Data16' and Data4 into the first block (Block_1). Then, the controller 101 selects the second block (Block_2) as the open block, and programs the data Data17', Data18', Data5 and Data6 into the second block (Block_2).

Similarly, after the data in the buffer 107 are programmed to the open blocks of the flash memory 105 by the controller 101, the moved valid data corresponding to the garbage collection and the write data from the host 12 are stored into the first block (Block_1) and the second block (Block_2) in the interlaced manner (see FIG. 3F).

Please refer to FIG. 3F again. If the storing space of the flash memory 105 is insufficient and the host 12 intends to update or overwrite the sequential write data Data15', Data16', Data17' and Data18', the controller 101 has to re-perform the garbage collection and repeatedly move the valid data corresponding to the previous garbage collection. The procedures are similar to those mentioned above, and are not redundantly described herein.

FIG. 4 schematically illustrates the data storage conditions in the flash memory of the conventional solid state drive. According to the above data programming method, each of the blocks Block_1~Block_n of the flash memory 105 may contain the moved valid data (GC) corresponding to the garbage collection and the write data (H) from the host 12 after the programming procedure comprising the garbage collection is completed many times.

For example, after the above data programming method, the data in the flash memory 105 of the conventional solid state drive 10 has the storage condition as shown in FIG. 4. If the host 12 issues a sequential write command, the controller 101 has to continuously re-perform the garbage collection and repeatedly move the valid data corresponding to the previous garbage collection. Consequently, free blocks are generated. Moreover, the open blocks also store the moved valid data (GC) corresponding to the garbage collection and the write data (H) from the host 12. Under this circumstance, the write speed of the solid state drive 10 decreases and fails to be effectively increased.

From the above discussions about the conventional data programming method, the moved valid data (GC) corresponding to the garbage collection and the write data (H) from the host 12 are stored in the flash memory 105 in the interlaced manner. Moreover, if the host 12 intends to update or overwrite the sequential write data, the controller 101 has to re-perform the garbage collection and repeatedly move the valid data corresponding to the previous garbage collection. Moreover, after the valid data in the to-be-released blocks are moved to the buffer 107, the controller 101 performs the block erase operation and programs the data into the flash memory 105. Moreover, since the buffer 107 still contains the valid data (GC) and the write data (H) in the interlaced manner, the valid data (GC) and the write data (H) are programmed into the open block in the interlaced manner.

During the sequential write process, the controller 101 has to continuously re-perform the garbage collection and repeatedly move the valid data corresponding to the previous garbage collection. Consequently, the write speed of the solid state drive 10 fluctuates between a high speed and a low speed. That is, the write speed cannot reach the desired level.

SUMMARY OF THE INVENTION

An embodiment of the present invention provides a data programming method for a solid state drive. The solid state drive has a flash memory with plural blocks. If a garbage collection is determined to be performed, a first open block is selected from the plural blocks of the flash memory for storing a moved valid data corresponding to the garbage collection. Then, the moved valid data corresponding to the garbage collection is programmed into the first open block. A second open block is selected from the plural blocks of the flash memory for storing a write data from a host.

Another embodiment of the present invention provides a solid state drive in communication with a host. The solid state drive includes a controller and a flash memory. The controller determines whether to perform a garbage collection. A flash memory is connected with the controller, and includes plural blocks. If the garbage collection is determined to be performed, the controller selects a first open block from the plural blocks of the flash memory for storing a moved valid data corresponding to the garbage collection, and programs the moved valid data corresponding to the garbage collection into the first open block. Moreover, a second open block is selected from the plural blocks of the flash memory for storing a write data from a host.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 2A~2C (prior art) schematically illustrate a process of updating data of a conventional flash memory;

FIGS. 3A~3F (prior art) schematically illustrate a data programming method comprising the garbage collection of the conventional solid state drive;

DETAILED DESCRIPTION OF PREFERRED EMBODIMENTS

Figure 5:
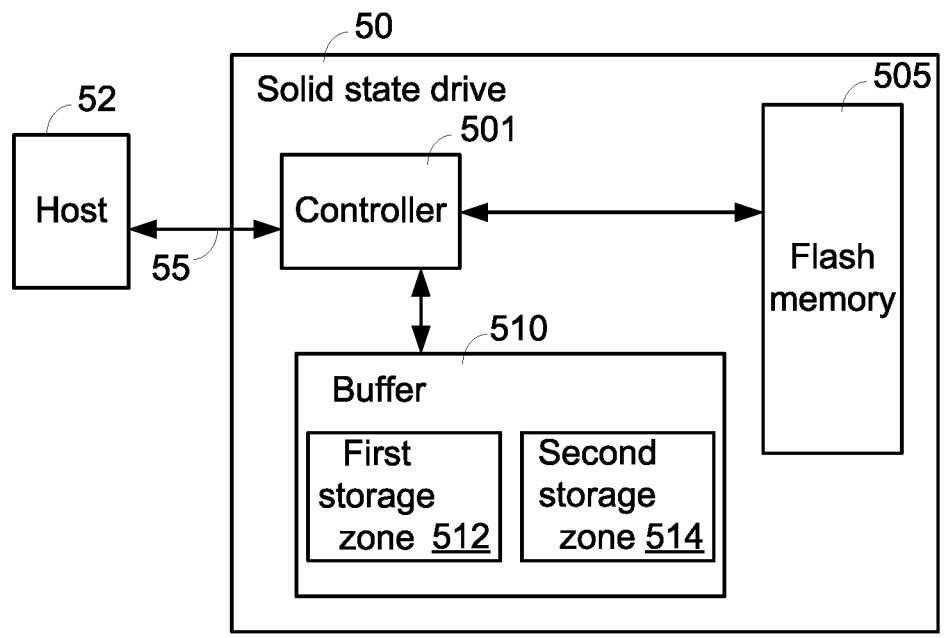
FIG. 5 is a schematic functional block diagram illustrating a solid state drive according to an embodiment of the present invention.

FIG. 5 is a schematic functional block diagram illustrating a solid state drive according to an embodiment of the present invention. As shown in FIG. 5, the solid state drive 50 comprises a controller 501, a buffer 510 and a flash memory 505. The controller 501 is in communication with the flash memory 505 and the buffer 510. In addition, the controller 501 is in communication with a host 52 through an external bus 55. Consequently, commands and data can be exchanged between the controller 501 and the host 52.

In accordance with the present invention, the buffer 510 is divided into a first storage zone 512 and a second storage zone 514. The moved valid data (GC) corresponding to the garbage collection are temporarily stored in the first storage zone 512. The write data (H) from the host 52 are temporarily stored in the second storage zone 514.

Moreover, the controller 51 selects two free blocks of the flash memory 505, and defines the two free blocks as a first open block and a second open block. The first open block is used for storing the moved valid data (GC) corresponding to the garbage collection. The second open block is used for storing the write data (H) from the host 52. While the program action is performed, the valid data (GC) in the first storage zone 512 and the write data (H) in the second storage zone 514 are respectively stored into the first open block and the second open block of the flash memory 505 by the controller 501. After the first open block is programmed and is full, the controller 501 selects an additional first open block from the flash memory 505 to store the valid data (GC). Similarly, after the second open block is programmed and is full, the controller 501 selects an additional second open block from the flash memory 505 to store the write data (H).

Since the moved valid data (GC) corresponding to the garbage collection and the write data (H) from the host 52 are programmed into different open blocks by the controller 501, the valid data (GC) and the write data (H) are not simultaneously contained in the same block. Under this circumstance, the write speed of the solid state drive 50 is enhanced.

Figure 1:
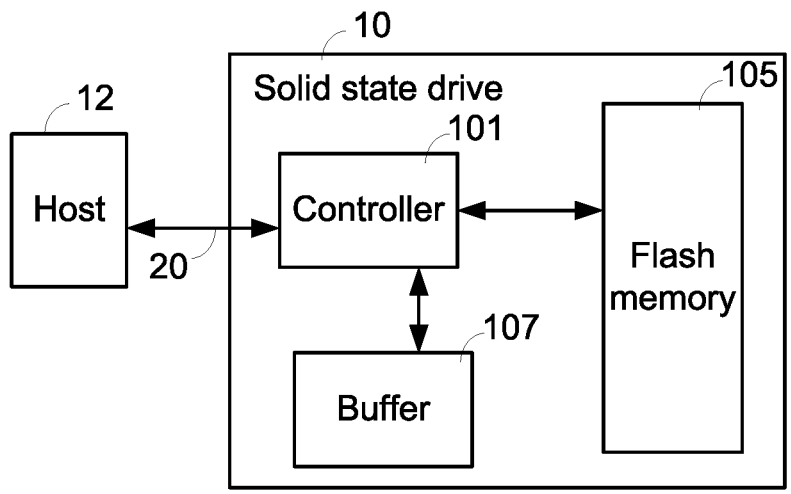
FIG. 1 (prior art) is a schematic functional block diagram illustrating a conventional solid state drive.
Figure 2A:
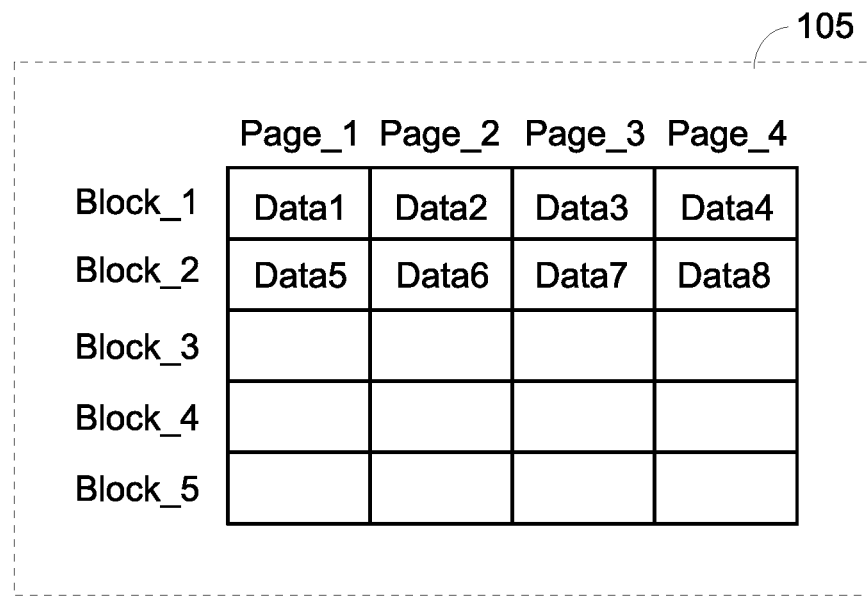
Figure 3D:
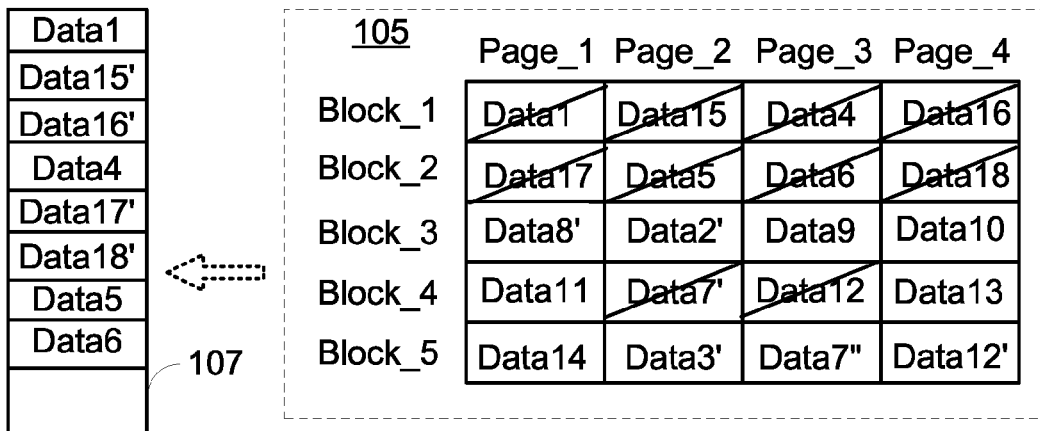
Figure 3E:
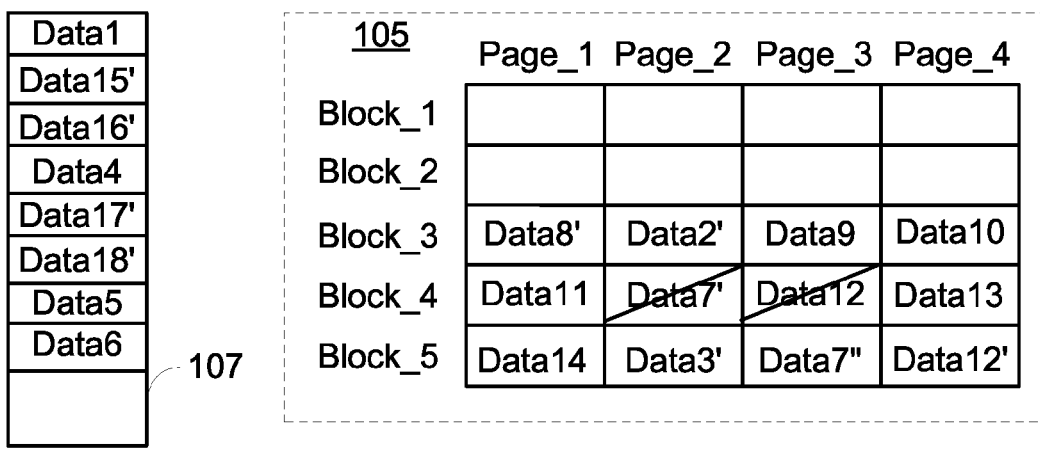
Figure 3F:
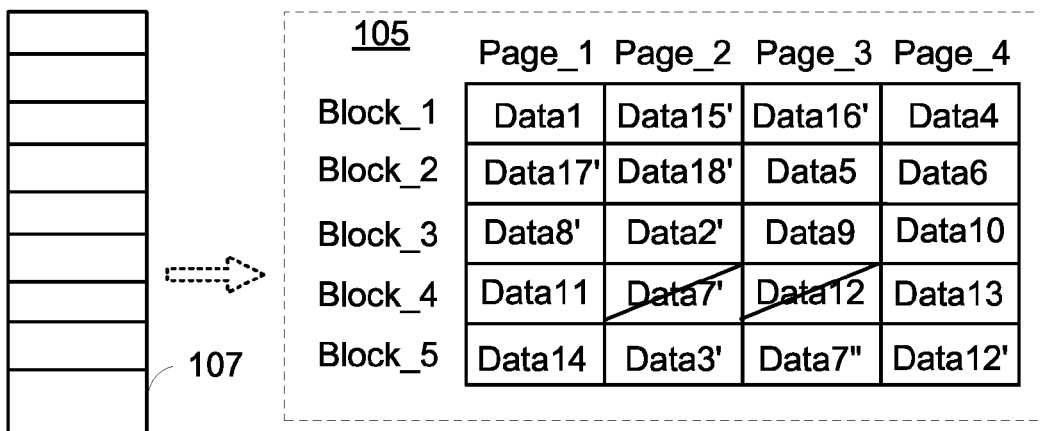
Figure 4:
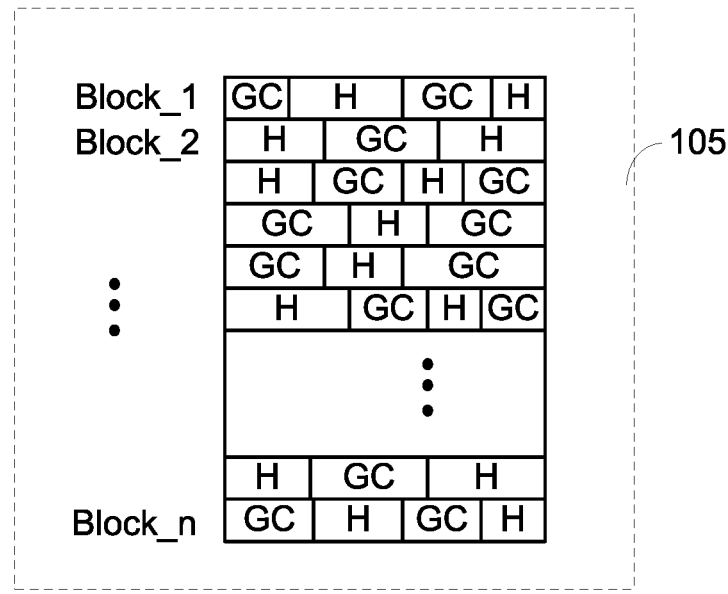
FIG. 4 (prior art) schematically illustrates the data storage conditions in the flash memory of the conventional solid state drive.

FIGS. 6A~6F schematically illustrate a data programming method comprising the garbage collection according to an embodiment of the present invention. Hereinafter, the operations of the garbage collection of the present invention after the situation of FIG. 2C will be illustrated. If the storing space of the flash memory is insufficient, the controller 501 performs the garbage collection in order to release storing space to program the new data.

Figure 6A:
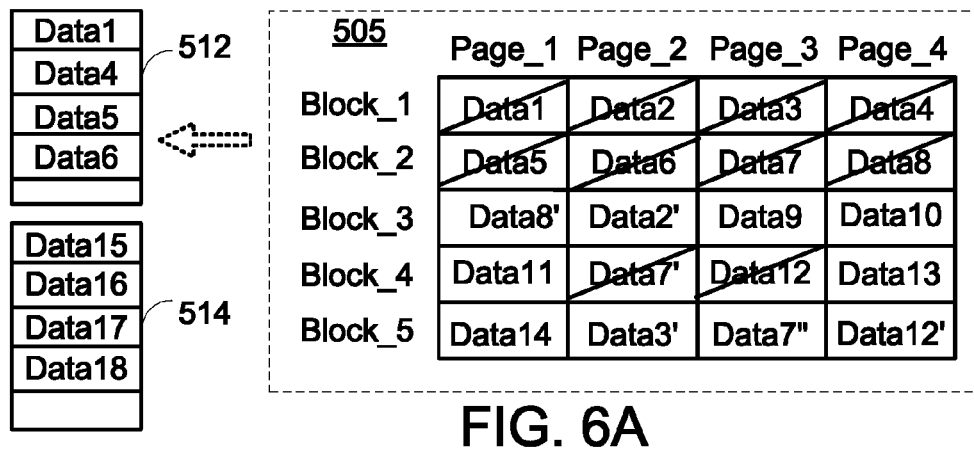
FIGS. 6A~6F schematically illustrate a data programming method comprising the garbage collection according to an embodiment of the present invention.

Please refer to FIG. 6A. The valid data Data1, Data4, Data5 and Data6 in the first block (Block_1) and the second block (Block_2) are moved to the first storage zone 512 of the buffer 510 by the controller 501. And then, the data Data1, Data4, Data5 and Data6 in the first block (Block_1) and the second block (Block_2) will be considered as invalid data, which are indicated as oblique lines.

Similarly, while the valid data in the to-be-released blocks are moved from the flash memory 505 by the controller 501, the write data from the host 52 are continuously received by the controller 501 and stored into the buffer 510. In other words, the controller 501 can simultaneously perform the garbage collection and receive the write data from the host 52. As shown in FIG. 6A, the moved valid data Data1, Data4, Data5 and Data6 corresponding to the garbage collection are stored in the first storage zone 512 of the buffer 510, and the write data Data15, Data16, Data17 and Data18 from the host 52 are stored in the second storage zone 514 of the buffer 510. The write data Data15, Data16, Data17 and Data18 are sequential write data.

Figure 6B:
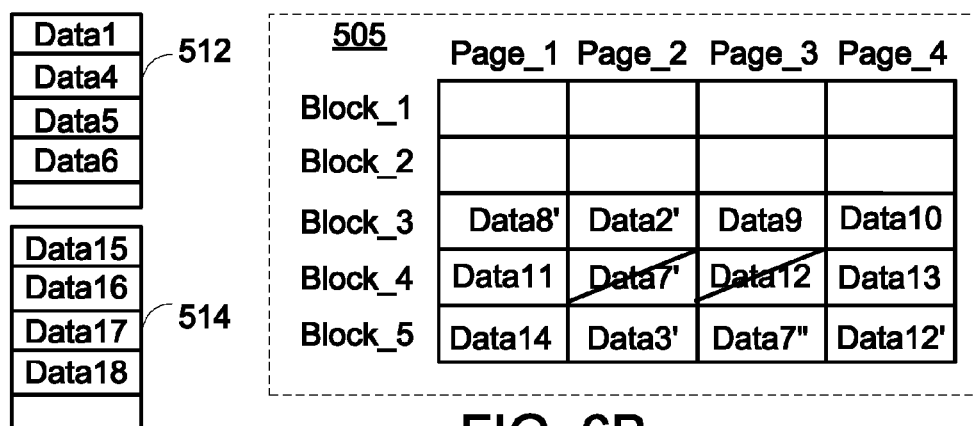

As shown in FIG. 6B, the controller 501 confirms that no valid data are contained in the first block (Block_1) and the second block (Block_2). Then, the controller 501 performs a block erase operation on the first block (Block_1) and the second block (Block_2). Consequently, the first block (Block_1) and the second block (Block_2) are erased as free blocks.

Figure 6C:
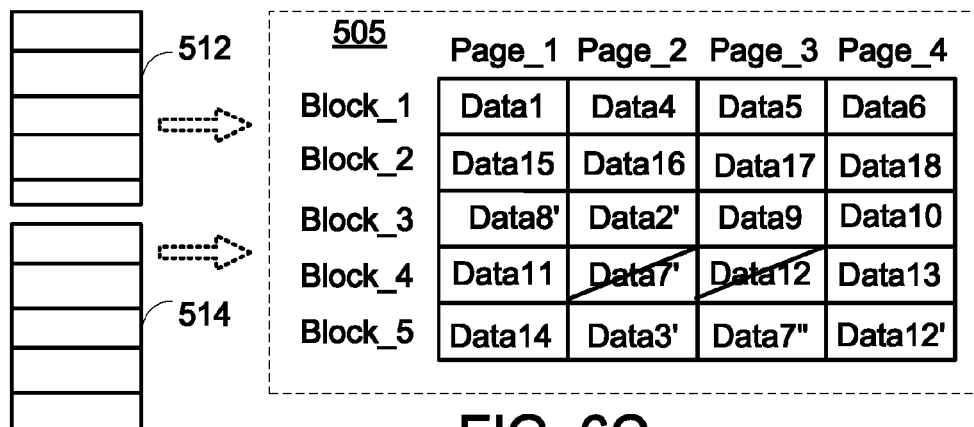

Then, as shown in FIG. 6C, the controller 501 performs the program action to program the data of the buffer 510 into the flash memory 505. Consequently, one programming procedure comprising the garbage collection is completed. That is, the controller 501 selects the first block (Block_1) as the first open block, and programs the moved valid data Data1, Data4, Data5 and Data6 into the first block (Block_1). And, the controller 501 selects the second block (Block_2) as the second open block, and programs the write data Data15, Data16, Data17 and Data18 into the second block (Block_2).

Obviously, the all data in the first block (Block_1) are the moved valid data (GC) corresponding to the garbage collection, and all data in the second block (Block_2) are the write data (H) from the host 52.

Please refer to FIG. 6C again. If the storing space of the flash memory 505 is insufficient, the controller 501 performs the garbage collection in order to program the new or updated data into the flash memory 505. For example, the host 52 intends to program the write data Data15', Data16', Data17' and Data18' to the flash memory 505. The write data Data15', Data16', Data17' and Data18' are sequential write data. Moreover, the write data Data15', Data16', Data17' and Data18' are updated data of the write data Data15, Data16, Data17 and Data18, respectively.

After the previous programming procedure comprising the garbage collection is performed, the moved valid data corresponding to the garbage collection are all stored in the first open block, i.e., the first block (Block_1). And, the second open block, i.e., the second block (Block_2), only stores the write data Data15, Data16, Data17 and Data18 from the host 52 but does not store the moved valid data corresponding to the garbage collection. Since the old data Data15, Data16, Data17 and Data18 in the second block (Block_2) are considered as the invalid data because these data have been updated, the controller 501 can directly perform a block erase action on the second block (Block_2) to acquire the storing space. Under this circumstance, it is not necessary to move the valid data.

Figure 6D:
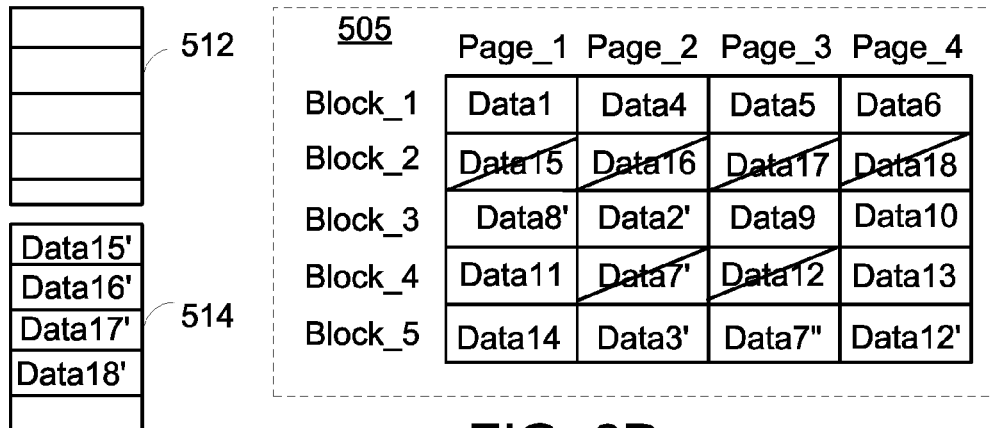
Figure 6E:
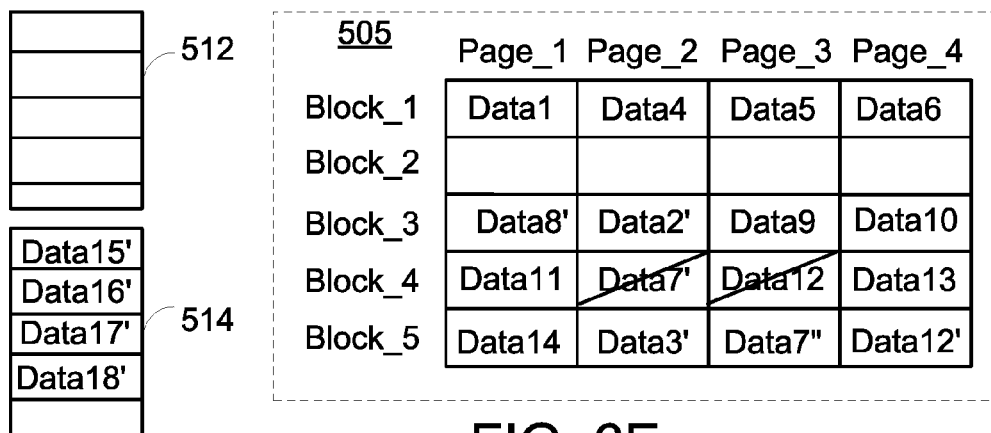

The process of performing another garbage collection will be illustrated with reference to FIGS. 6D-6F. Firstly, as shown in FIG. 6D, the write data Data15', Data16', Data17' and Data18' from the host 52 are temporarily stored into the second storage zone 514 of the buffer 510. Meanwhile, the old data Data15, Data16, Data17 and Data18 in the second block (Block_2) will be considered as the invalid data, which are indicated as oblique lines. As shown in FIG. 6E, the controller 501 confirms that no valid data are contained in the second block (Block_2). Then, the controller 501 performs a block erase operation on the second block (Block_2). Consequently, the second block (Block_2) is erased as a free block.

Figure 6F:
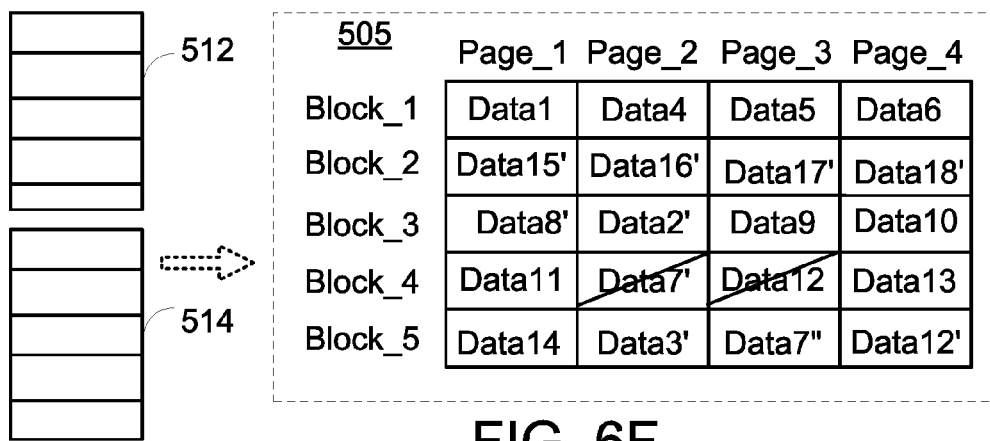

Then, as shown in FIG. 6F, the controller 501 performs the program action to program the data of the buffer 510 into the flash memory 505. Consequently, another programming procedure comprising the garbage collection is completed. That is, the controller 501 selects the second block (Block_2) as the second open block, and programs the write data Data15', Data16', Data17' and Data18' into the second block (Block_2). In this programming procedure comprising the garbage collection, it is not necessary to repeatedly move the valid data corresponding to the previous garbage collection. Since the block erase operation is directly performed, the write speed of the solid state drive 50 is not reduced.

From the above descriptions, the present invention provides a solid state drive and a data programming method. The controller selects two free blocks as the first open block and the second open block. The first open block is used for storing the moved valid data (GC) corresponding to the garbage collection. The second open block is used for storing the write data (H) from the host. Moreover, the buffer is divided into a first storage zone and a second storage zone. The moved valid data (GC) corresponding to the garbage collection are temporarily stored in the first storage zone. The write data (H) from the host are temporarily stored in the second storage zone.

Figure 7:
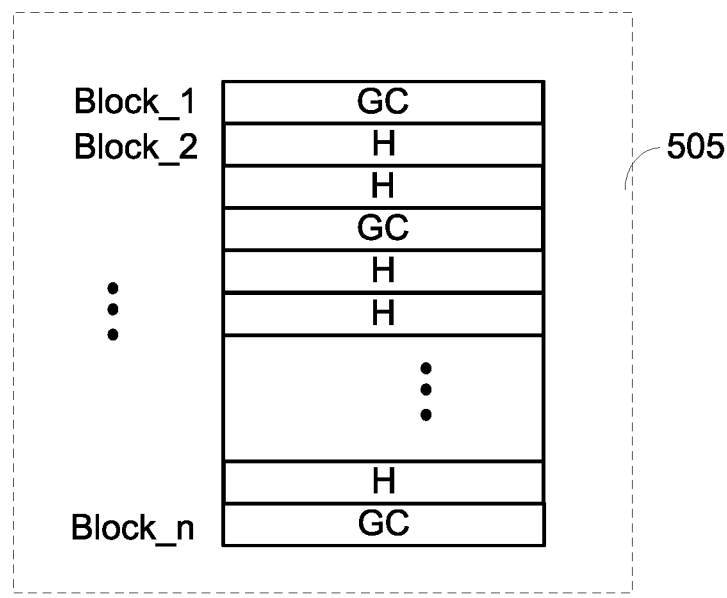
FIG. 7 schematically illustrates the data storage conditions in the flash memory of the solid state drive according to an embodiment of the present invention.

FIG. 7 schematically illustrates the data storage conditions in the flash memory of the solid state drive according to an embodiment of the present invention. As shown in FIG. 7, each of the blocks Block_1~Block_n of the flash memory 505 contains either the moved valid data (GC) corresponding to the garbage collection or the write data (H) from the host after the programming procedure comprising the garbage collection is completed many times. That is, the moved valid data (GC) and the write data (H) are not simultaneously contained in the same block.

Moreover, if the storing space of the flash memory 505 is insufficient and the host 52 intends to update or overwrite the sequential write data, the block of the flash memory 505 storing the write data (H) has higher probability of being completely occupied by invalid data because the block of the flash memory 505 storing the write data (H) does not have the moved valid data (GC) corresponding to the garbage collection. Under this circumstance, the controller 501 does not need to repeatedly move the valid data and perform the program action. After the block completely occupied by invalid data is erased, the controller 501 may set the erased free block as the second open block and directly program the write data into the second open block.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data programming method for a solid state drive, the solid state drive having a flash memory with plural blocks and a buffer, the data programming method comprising steps of:
    temporarily storing a valid data corresponding to a garbage collection in a first storage zone of the buffer when the garbage collection is determined to be performed during a data programming process issued by a host;
    temporarily storing a write data from the host in a second storage zone of the buffer, wherein the first storage zone and the second storage zone are individual for respectively temporarily storing the valid data and the write data at the same time;
    selecting a first open block and a second open block from the plural blocks of the flash memory, wherein the first open block and the second open block are simultaneously existed;
    programming the valid data corresponding to the garbage collection into the first open block; and
    programming the write data from the host into the second open block.

2. The data programming method as claimed in claim 1, wherein each of the plural blocks of the flash memory contains either the moved valid data corresponding to the garbage collection or the write data from the host.

3. A data programming method for a solid state drive, the solid state drive having a flash memory with plural blocks, the data programming method comprising steps of: determining whether to perform a garbage collection during a data programming process issued by a host: if the garbage collection is determined to be performed during the data programming process, selecting a first open block from the plural blocks of the flash memory; and programming a moved valid data corresponding to the garbage collection into the first open block, wherein, during the data programming process, a second open block is selected from the plural blocks of the flash memory, and a write data from the host is programmed into the second open block, wherein the first open block and the second open block are simultaneously existed; and wherein the solid state drive further comprises a buffer, and the buffer comprises a first storage zone and a second storage zone, wherein the moved valid data corresponding to the garbage collection is temporarily stored in the first storage zone, and the write data from the host is temporarily stored in the second storage zone.

4. The data programming method as claimed in claim 3, wherein each of the plural blocks of the flash memory contains either the moved valid data corresponding to the garbage collection or the write data from the host.

5. The data programming method as claimed in claim 3, wherein the moved valid data corresponding to the garbage collection and the write data from the host are respectively stored in different blocks of the flash memory.

6. The data programming method as claimed in claim 3, wherein if the garbage collection is determined to be performed and the write data from the host is received by the solid state drive, the data programming method further comprises a step of programming the write data from the host into the second open block.

7. A solid state drive in communication with a host, the solid state drive comprising:
    a controller determining whether to perform a garbage collection during a data programming process issued by the host;
    a flash memory connected with the controller, and comprising plural blocks; and
    a buffer;
    wherein if the garbage collection is determined to be performed, a moved valid data corresponding to the garbage collection is temporarily stored in a first storage zone, and a write data from the host is temporarily stored in the second storage zone, wherein the first storage zone and the second storage zone are individual for respectively temporarily storing the valid data and the write data at the same time,
    wherein the controller selects a first open block and a second open block from the plural blocks of the flash memory, programs the moved valid data corresponding to the garbage collection into the first open block, and programs the write data from the host into the second open block,
    wherein the first open block and the second open block are simultaneously existed.

8. The solid state drive as claimed in claim 7, wherein each of the plural blocks of the flash memory contains either the moved valid data corresponding to the garbage collection or the write data from the host.

9. The solid state drive as claimed in claim 7, wherein the moved valid data corresponding to the garbage collection and the write data from the host are respectively stored in different blocks of the flash memory.

10. The solid state drive as claimed in claim 7, wherein if the garbage collection is performed and the write data from the host is received by the solid state drive, the controller further programs the write data from the host into the second open block.

* * * * *